(12) United States Patent
Komatsu

(10) Patent No.: US 11,243,726 B2
(45) Date of Patent: Feb. 8, 2022

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Kohei Komatsu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/148,163

(22) Filed: Jan. 13, 2021

(65) Prior Publication Data
US 2021/0232352 A1     Jul. 29, 2021

(30) Foreign Application Priority Data
Jan. 24, 2020   (JP) .............................. JP2020-010262

(51) Int. Cl.
| | | |
|---|---|---|
| *G06F 15/00* | (2006.01) | |
| *G06K 1/00* | (2006.01) | |
| *G06K 15/00* | (2006.01) | |
| *G06F 3/12* | (2006.01) | |
| *G08B 5/22* | (2006.01) | |

(52) U.S. Cl.
CPC ............ *G06F 3/1234* (2013.01); *G06F 3/121* (2013.01); *G06F 3/1292* (2013.01); *G08B 5/22* (2013.01)

(58) Field of Classification Search
CPC ...... G06F 3/1234; G06F 3/121; G06F 3/1292; G08B 5/22
USPC .............................. 358/1.13, 1.14, 1.15, 1.1
See application file for complete search history.

(56) References Cited

U.S. PATENT DOCUMENTS

| | | | | |
|---|---|---|---|---|
| 2013/0088740 A1* | 4/2013 | Nishimura | ......... | G03G 15/0879 |
| | | | | 358/1.14 |
| 2014/0233967 A1* | 8/2014 | Suzuki | .................. | G06F 3/1239 |
| | | | | 399/12 |
| 2020/0301635 A1* | 9/2020 | Ogawa | .................. | G06F 3/1271 |

FOREIGN PATENT DOCUMENTS

JP          2013-178829 A      9/2013

* cited by examiner

*Primary Examiner* — Douglas Q Tran
(74) *Attorney, Agent, or Firm* — Canon U.S.A., Inc. IP Division

(57) ABSTRACT

A print plugin different from an application displaying an application screen on a terminal may be unable to display a screen over the application screen at timing unintended by a user. In such a case, the print plugin is unable to display a warning screen for notifying the user of a warning related to print processing, and the user is unable to be informed of occurrence of the warning. If the warning screen is unable to be displayed over the application screen, the print plugin instructs the terminal to issue a notification for calling the warning screen.

18 Claims, 15 Drawing Sheets

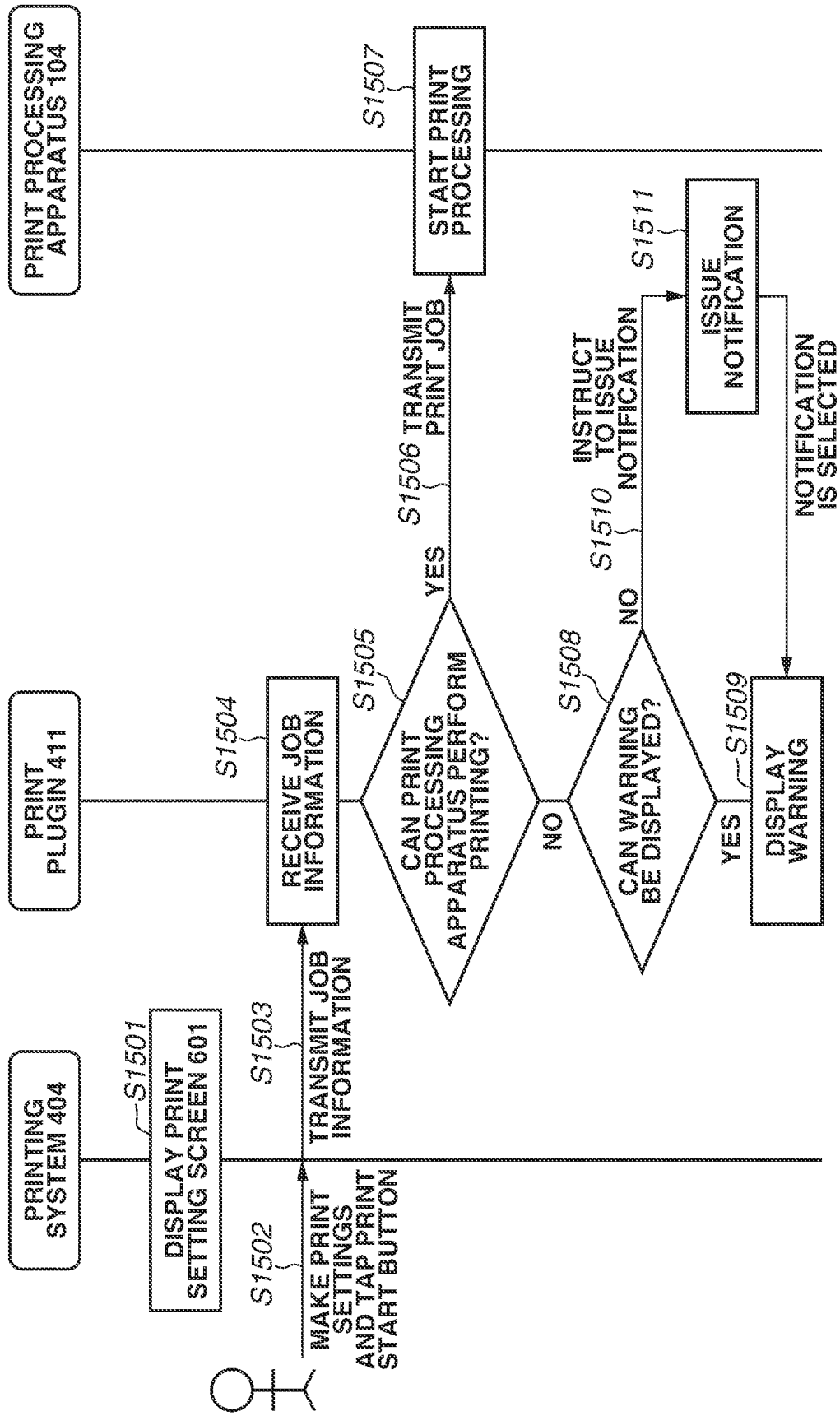

INFORMATION PROCESSING APPARATUS, CONTROL METHOD, AND STORAGE MEDIUM

BACKGROUND

Field of the Disclosure

The present disclosure relates to an information processing apparatus, a control method, and a storage medium.

Description of the Related Art

With the prevalence of mobile terminals in recent years, more and more mobile terminals are being employed as enterprise business terminals. More and more print processing apparatuses such as a multifunction peripheral and a printer can receive a print job from a mobile terminal via a wireless local area network (LAN) and perform print processing based on the received print job. Under the circumstances, more mobile terminal operating systems (OSes) running on mobile terminals, such as Android®, are supporting a print function by default. In the case of Windows® running on a personal computer, software called a printer driver is in charge of a print function. Android® uses software called a print plugin instead of the printer driver.

A print plugin is an application that performs processing in the background in cooperation with a screen displayed by the Android® OS. Specifically, the print plugin performs processing related to the generation of a print job based on print settings accepted from a user via a screen displayed by the Android® OS.

In generating a print job, the print plugin determines whether printing can be performed with the print settings included in the print job. For example, depending on a combination of print settings set by the user or the settings of the mobile terminal, a print processing apparatus may be unable to perform printing based on the settings. Japanese Patent Application Laid-Open No. 2013-178829 discusses a method where, if print processing is unable to be performed with print settings made by a user, a dialog is displayed to inform the user of the warning and make the user select whether to modify the print settings into printable settings and continue printing or cancel the printing.

Suppose that the user is to be informed of the foregoing warning in printing a picture displayed by a picture management application by using the print plugin. In such a case, the print plugin running in the background can notify the user of an error by displaying a warning screen over the screen displayed by the picture management application.

However, on some OSes running on mobile terminals, an application other than the application displaying the screen is unable to display another screen over the displayed screen without a user's instruction. This makes the print plugin running in the background unable to display the warning screen over the screen displayed by the picture management application as described above. Thus, if a warning about the print processing occurs, the user is unable to be informed of the occurrence of the warning.

SUMMARY

Embodiments of the present disclosure are directed to providing a method for informing a user of the occurrence of a warning about print processing even if an application different from the application that is displaying an application screen on a terminal is unable to display a warning screen over the application screen.

According to embodiments of the present disclosure, a method for a terminal configured to transmit a print job to a print processing apparatus includes, in a case where an instruction to perform printing with a print setting accepted by the terminal is given by a user and a warning based on the print setting is to be displayed, instructing an operating system of the terminal to issue a notification for calling a warning screen, and in a case where a predetermined operation performed on the notification by the user is accepted, displaying the warning screen over a screen of an application.

Further features of the present disclosure will become apparent from the following description of exemplary embodiments with reference to the attached drawings.

BRIEF DESCRIPTION OF THE DRAWINGS

FIG. 15 is a sequence diagram illustrating an outline of the first exemplary embodiment.

DESCRIPTION OF THE EMBODIMENTS

Exemplary embodiments will be described in detail below with reference to the accompanying drawings. Not all combinations of features described in the exemplary embodiments are necessarily indispensable to the solving means of the present disclosure.

Figure 1:
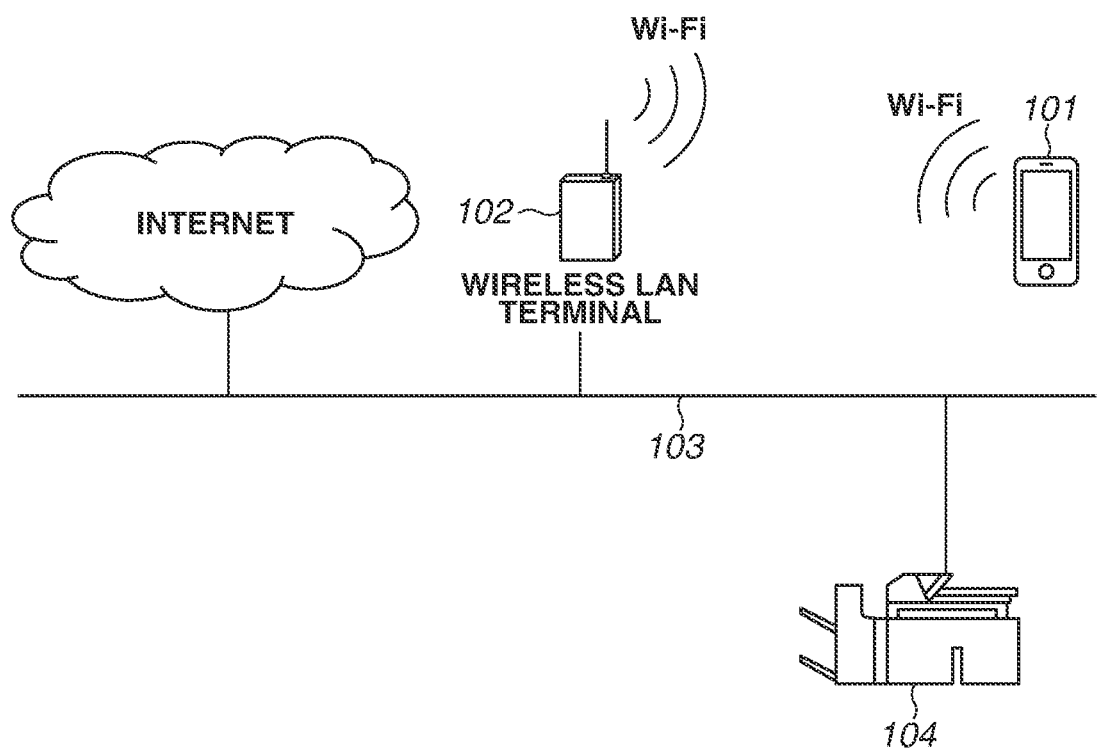
FIG. 1 is a diagram illustrating a system configuration according to an exemplary embodiment of the present disclosure.

A first exemplary embodiment will be described in detail below with reference to the drawings. FIG. 1 is a diagram illustrating a configuration of an information processing system according to the present exemplary embodiment. In FIG. 1, a data processing apparatus 101 is a computer used to transmit a print job to a print processing apparatus 104. Examples of the data processing apparatus 101 include a mobile terminal such as a smartphone and a tablet. The print processing apparatus 104 may have a copy function, a scanner function, and a facsimile transmission function aside from a print function.

The data processing apparatus 101 and the print processing apparatus 104 are connected to a local area network (LAN) 103. The data processing apparatus 101 and the print processing apparatus 104 communicate with each other via the LAN 103. A wireless LAN terminal 102 is a wireless LAN base station having a typical network router function, and provides a wireless LAN at home or in an office. The data processing apparatus 101 can join the LAN 103 via the wireless LAN terminal 102 by enabling its wireless LAN function. Entering a wireless LAN area provided by the wireless LAN terminal 102, the data processing apparatus 101 can automatically join the LAN 103 by using authentication information set in the data processing apparatus 101 in advance.

Figure 2:
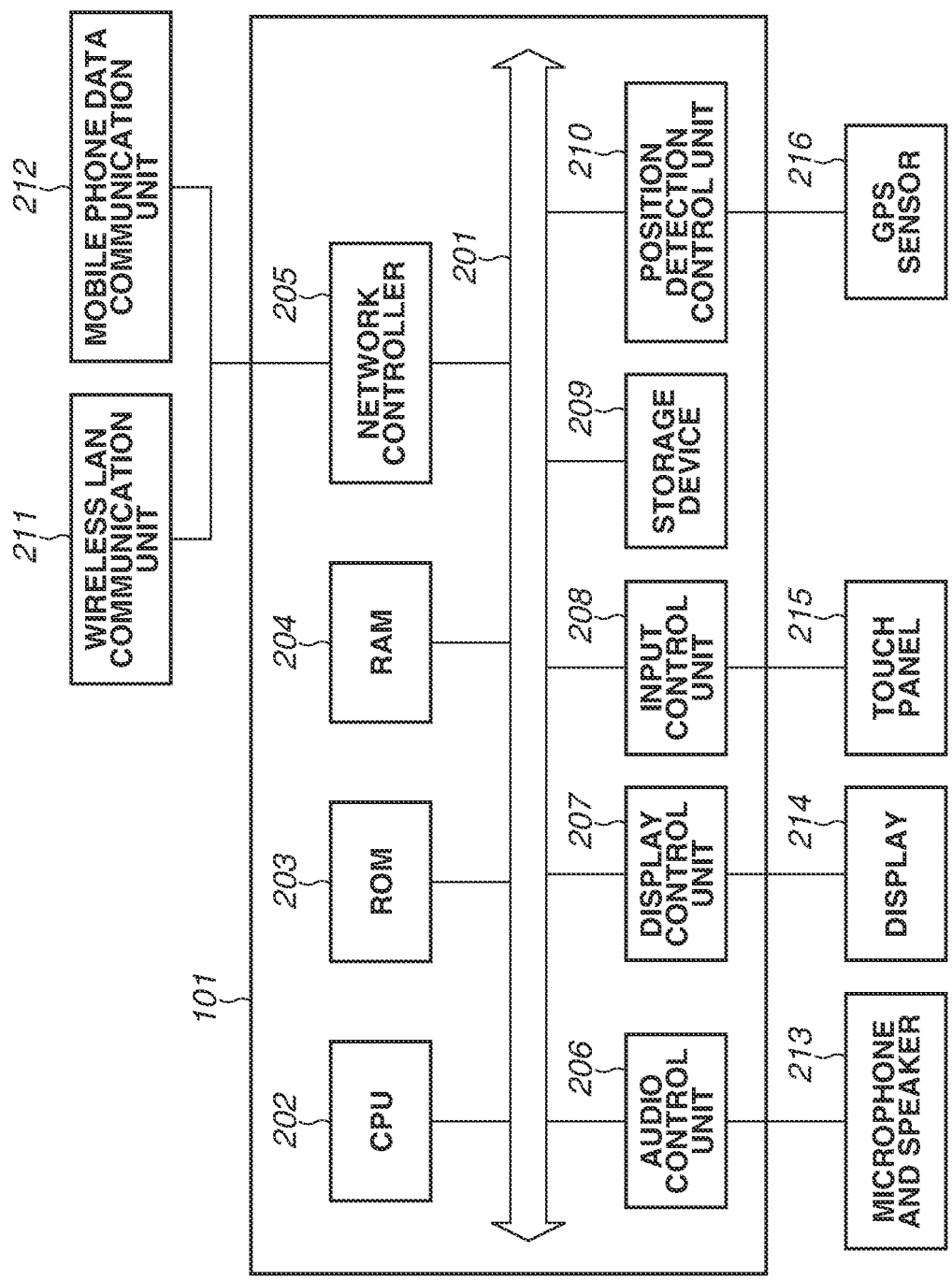
FIG. 2 is a block diagram illustrating a hardware configuration of a data processing apparatus.

FIG. 2 is a block diagram illustrating a hardware configuration of the data processing apparatus 101 in FIG. 1. The data processing apparatus 101 is a terminal such as a tablet and a smartphone, on which a compact-terminal operating system and programs for controlling telephone call and data communication may be run.

Alternatively, the data processing apparatus 101 may be a personal computer that does not include an audio control unit 206, a microphone and speaker 213, a position detection control unit 210, a Global Positioning System (GPS) sensor 216, or a mobile phone data communication unit 212 to be described below.

The hardware components are connected to a system bus 201. A read-only memory (ROM) 203 stores an operating system of the data processing apparatus 101 and applications for controlling telephone call and data communication, which are executed by a central processing unit (CPU) 202. Examples of the application for controlling data communication include a print plugin (printing plugin), email software, and a web browser.

A random access memory (RAM) 204 is a memory for executing programs. The RAM 204 serves as a work memory area where application programs are executed. The RAM 204 also serves as a memory in which the applications temporarily store data to be temporarily saved during program execution. A storage device 209 is a nonvolatile storage device, and stores various operating mode settings and operation logs to be stored even after restart of the data processing apparatus 101.

A network controller 205 controls communication of a wireless LAN communication unit 211 and the mobile phone data communication unit 212. The wireless LAN communication unit 211 is intended to participate in the LAN 103 via the wireless LAN terminal 102. The mobile phone data communication unit 212 is intended to participate in a network provided by a mobile phone carrier.

The audio control unit 206 is used, for example, when a telephone call application is activated and the user makes a telephone call. The user inputs and outputs audio data using the microphone and speaker 213, and the audio control unit 206 mediates between the audio data and an audio data control program.

A display control unit 207 controls information to be output by a display 214 of the data processing apparatus 101. An input control unit 208 controls information designated by the user from a button or a touch panel 215 of the data processing apparatus 101. Applications running on the data processing apparatus 101 provide network communication information and various types of information about the data processing apparatus 101 to the user by using the audio control unit 206, the display control unit 207, and the input control unit 208.

The position detection control unit 210 obtains position information about the data processing apparatus 101 from the GPS sensor 216, and provides the position information to the operating system. Such controls are performed by the operating system running on the CPU 202.

Figure 3:
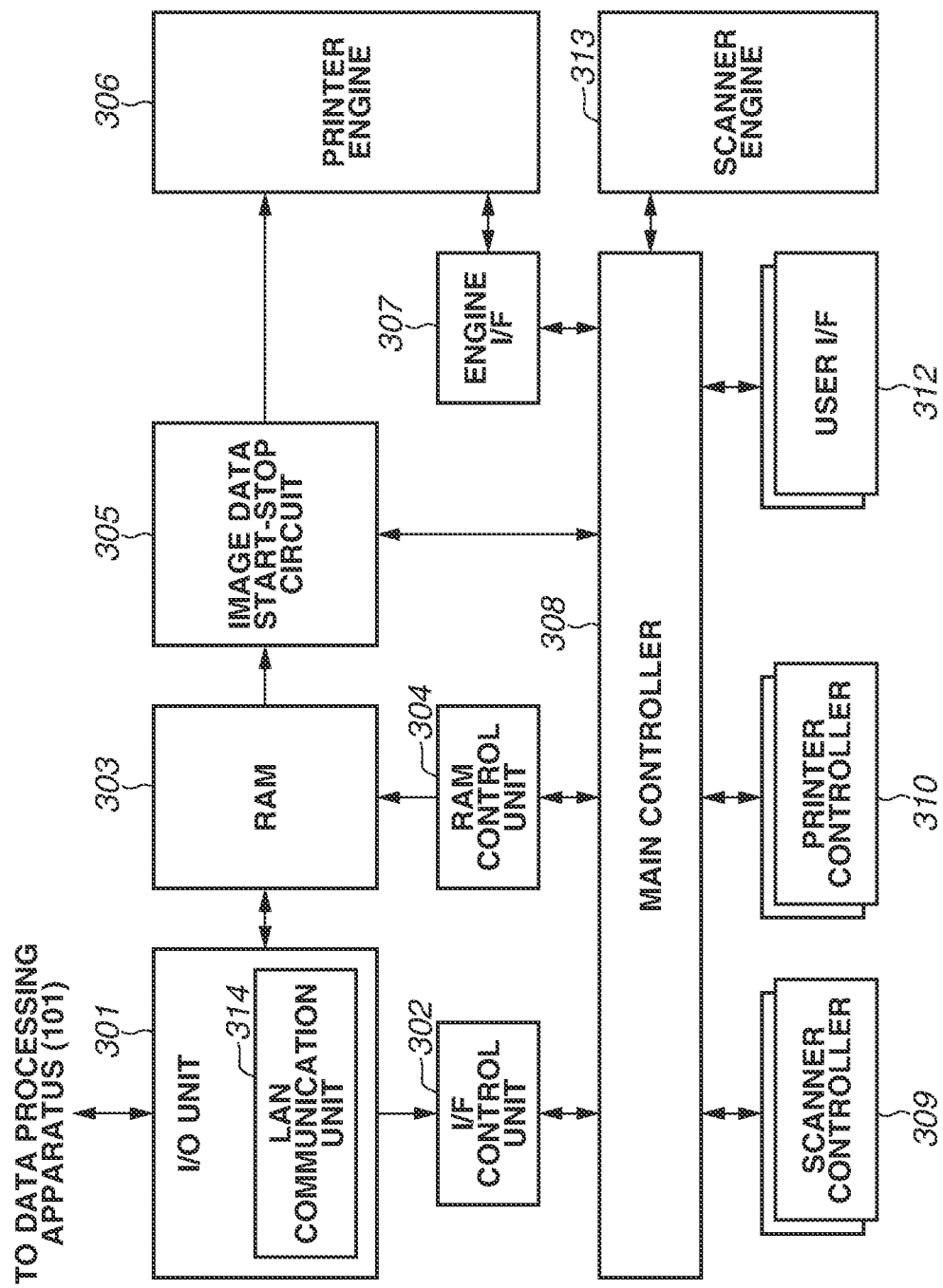
FIG. 3 is a block diagram illustrating a hardware configuration of a print processing apparatus.

FIG. 3 is a block diagram for describing a hardware configuration of the print processing apparatus 104 in FIG. 1. The present exemplary embodiment describes a case where the print processing apparatus 104 is a multifunction peripheral (MFP) having a scanner function and a printer function.

In FIG. 3, an input/output (I/O) unit 301 includes a LAN communication unit 314. The LAN communication unit 314 can communicate with the data processing apparatus 101 via the network (LAN) 103. A plurality of I/O units 301 may be included to implement a plurality of communication modes. The print processing apparatus 104 passes a device identifier (ID) and a scanned image to the data processing apparatus 101 via the I/O unit 301. The I/O unit 301 also receives various control commands from the data processing apparatus 101 and performs processing. An interface (I/F) control unit 302 controls issuance of device IDs to processing systems implemented on the print processing apparatus 104, such as a scanner, a printer, and/or a facsimile. A RAM 303 is a primary storage device. The RAM 303 is used to store external data, such as a control command obtained by the I/O unit 301, and image data (hereinafter, referred to as an image) read by a scanner engine 313. The RAM 303 is also used to store an image that is rasterized by a printer controller 310 and yet to be passed to a printer engine 306. A RAM control unit 304 controls allocation of the RAM 303. An image data start-stop circuit 305 is a device that outputs an image rasterized by the printer controller 310 or an image captured by the scanner engine 313 and loaded into the RAM 303 in synchronization with rotation of the printer engine 306. The printer engine 306 is a device that develops an image on an output medium such as a sheet of paper. A main controller 308 performs various types of control on the printer engine 306 via an engine I/F 307. The main controller 308 is a key module for control, and performs processing for appropriately assigning control languages received from the data processing apparatus 101 via the I/O unit 301 to a scanner controller 309 and the printer controller 310. The main controller 308 further controls the printer engine 306 and the scanner engine 313 based on instructions from the foregoing controllers and a user I/F 312. The scanner controller 309 breaks down a scan control command received from the data processing apparatus 101 into internal execution instructions interpretable by the main controller 308. The scanner controller 309 also converts an image read by the scanner engine 313 into scan control commands. The printer controller 310 breaks down a page description language (PDL) received as a print job from the data processing apparatus 101 into internal execution instructions including a rasterized image interpretable by the main controller 308. The rasterized image is delivered to the printer engine 306 and printed on an output medium such as a sheet of paper.

Figure 4:
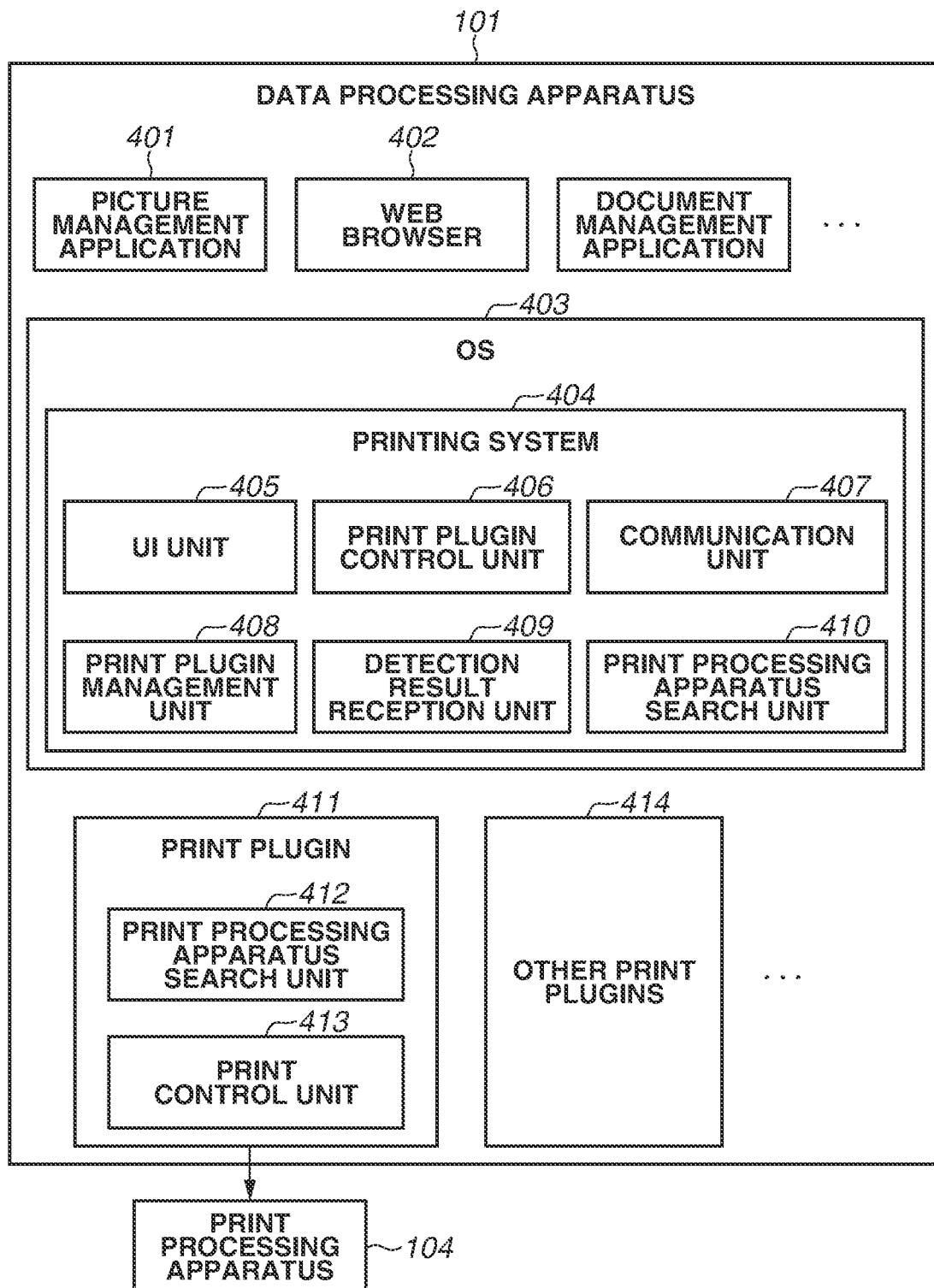
FIG. 4 is a block diagram illustrating a software configuration of the data processing apparatus.

FIG. 4 is a block diagram for describing a software configuration of the data processing apparatus 101 illustrated in FIG. 1. Each piece of software is installed in the ROM 203 as an application that runs on an operating system (OS). A picture management application 401 is an application for displaying and managing pictures. A web browser 402 is an application for browsing web pages. The applications installed on the data processing apparatus 101 are not limited thereto, and another application such as a document management application may be installed. Such applications 401 and 402 can print contents such as a picture, a document, and a web page displayed on the applications 401 and 402 via a printing system 404 and a print plugin 411. The printing system 404 is part of the framework of an OS 403. The printing system 404 includes a user interface (UI) unit 405, a print plugin control unit 406, a communication unit 407, a print plugin management unit 408, a detection result reception unit 409, and a print processing apparatus search unit 410. The UI unit 405 provides a UI of the printing system 404. The UI unit 405 displays a screen for accepting print settings on the display 214, and accepts the user's operations from the screen. The print plugin control unit 406 controls operation of the print plugin (plugin module) 411 installed on the data processing apparatus 101. The communication unit 407 performs processing related to network communication with the print processing apparatus 104 using a wireless LAN. The print plugin management unit 408 manages information about the print plugin 411 installed on the data processing apparatus 101. The detection result reception unit 409 receives notification of a detection result when the print plugin 411 detects a print processing apparatus on the network. The print processing apparatus search unit 410 is a function for searching for a print processing apparatus, implemented in the data processing apparatus 101 in advance. The print processing apparatus search unit 410 searches the network for a print processing apparatus based on a request from the applications installed on the data processing apparatus 101.

The print plugin 411 has the functions of searching for a print processing apparatus, generating a print job (including print data and print settings), and obtaining status information about the print processing apparatus. The print plugin 411 bridges the printing system 404 and the print processing apparatus (target print processing apparatus) to give print instructions to, searched by the print plugin 411. The print plugin 411 basically runs in the background and does not have a screen for making print settings. The print plugin 411 accepts print settings via the screen provided by the UI unit 405 of the printing system 404, and generates a print job. A print plugin other than the print plugin 411 may be installed on the data processing apparatus 101. The print plugin 411 can be installed and uninstalled as appropriate. The print plugin management unit 408 of the printing system 404 manages an installation state of each print plugin. The print plugin 411 includes a print processing apparatus search unit 412 and a print control unit 413. For ease of description, in the present exemplary embodiment, the print plugin 411 is a print plugin compliant with standard specifications that deal with print processing apparatuses from a plurality of vendors. However, this is not restrictive. The print processing apparatus search unit 412 searches the network for a print processing apparatus by using multicasting and broadcasting. The Service Location Protocol (SLP) or the multicast Domain Name System (DNS) protocol is used in searching for a print processing apparatus. However, this is not restrictive. Print plugins may use respective different protocols. The print control unit 413 obtains status information and capability information from the target print processing apparatus 104. The print control unit 413 also generates a print job based on the print settings accepted by the UI unit 405 of the printing system 404 and transmits the print job to the target print processing apparatus 104. The print control unit 413 also performs rendering processing on PDL data or image data printable by the target print processing apparatus 104. The data processing apparatus 101 may have a plugin other than the print plugin 411.

The OS 403 issues a notification such as a popup notification based on an instruction from each of the applications and plugins. The OS 403 also provides an application programming interface (API) for each of the applications and plugins to obtain version information about the OS 403.

Figure 5:
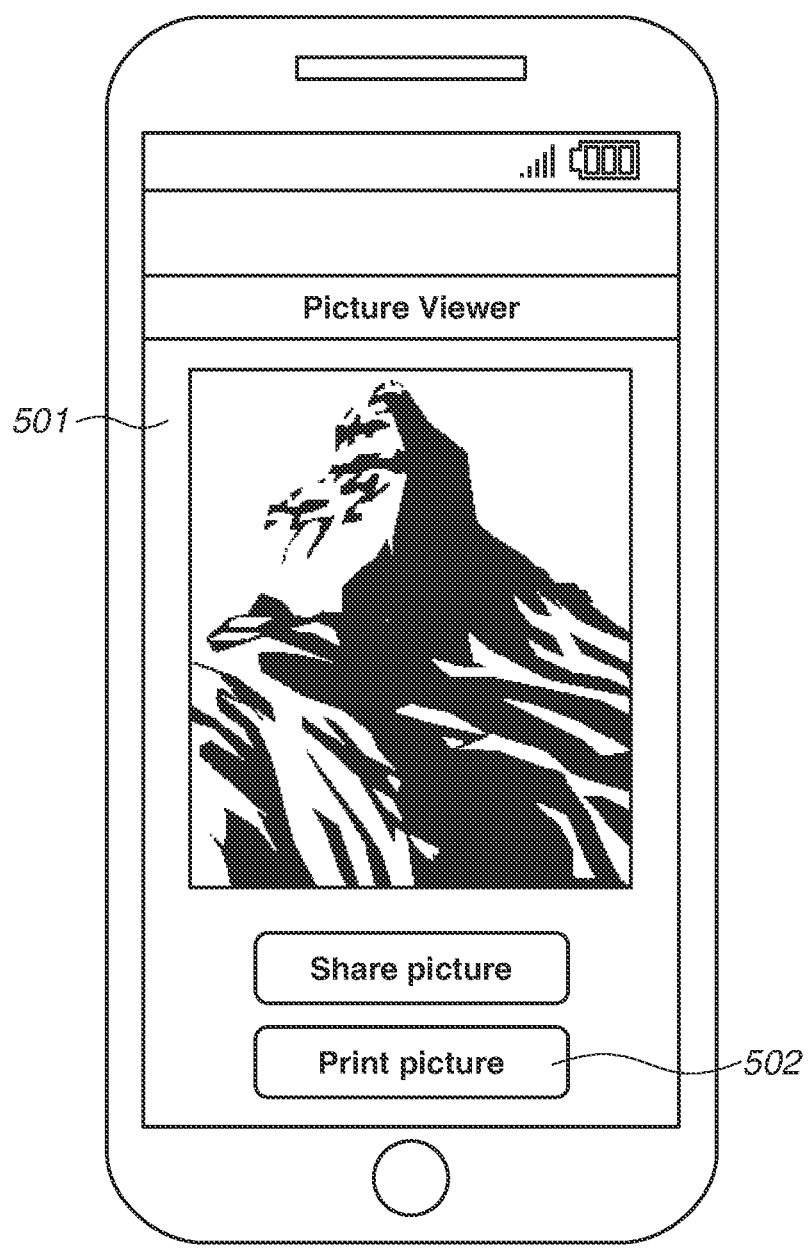
FIG. 5 is a diagram illustrating an example of a screen displayed by an application running on the data processing apparatus.

FIG. 5 is a diagram illustrating an example of a display screen of the picture management application 401. The display screen is a screen displayed by a UI unit of the picture management application 401. The picture management application 401 can cause the print processing apparatus 104 to perform print processing of a picture displayed on the picture management application 401, using the printing system 404 and the print plugin 411. If the user taps a print button 502 on an application screen 501 where the picture to be printed is displayed, the screen illustrated in FIG. 6 appears.

Figure 6:
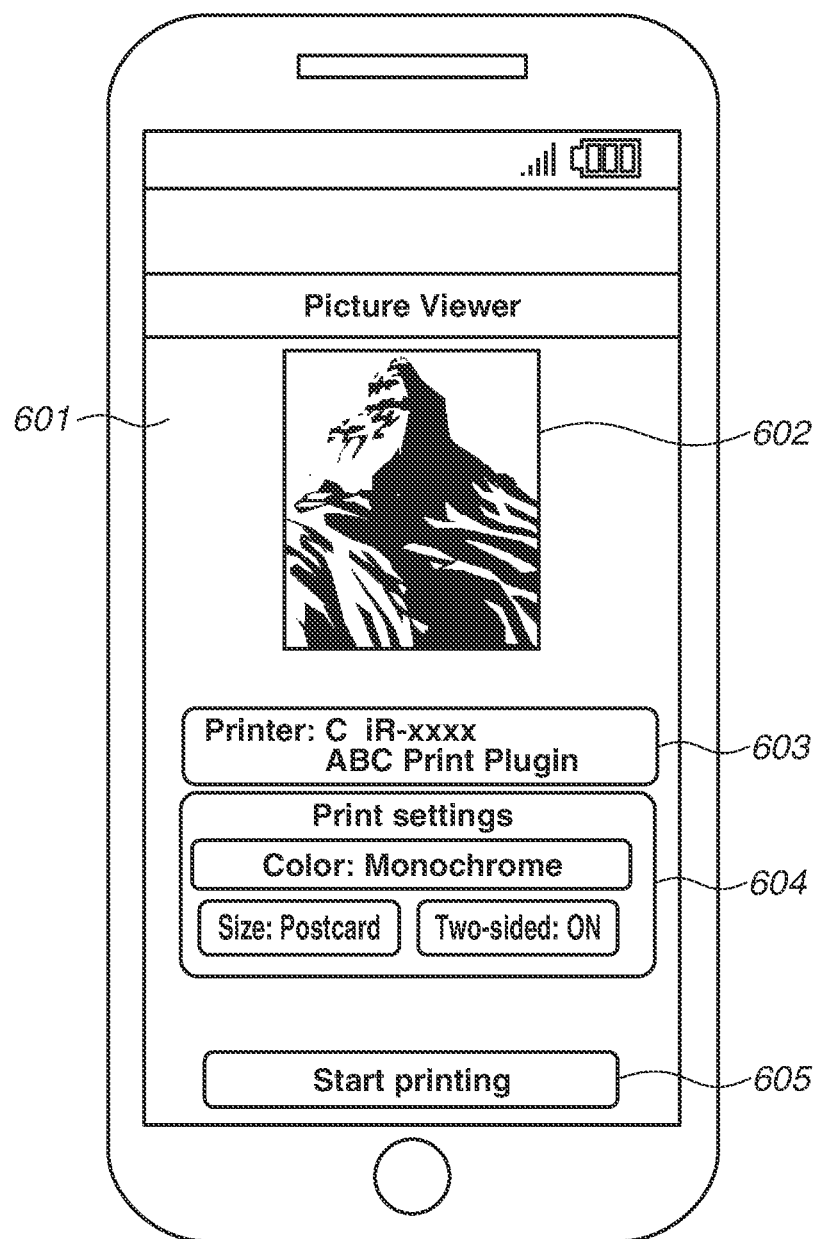
FIG. 6 is a diagram illustrating a print setting screen displayed by a printing system running on the data processing apparatus.

FIG. 6 illustrates a print setting screen 601 displayed by the UI unit 405 of the printing system 404. The print setting screen 601 includes a print preview display area 602, a target print processing apparatus display area 603, a print setting area 604, and a print start button 605. Here, a print processing apparatus "C iR-xxxx" found in a search made by the print processing apparatus search unit 412 included in a print plugin "ABC Print Plugin" is selected as the target print processing apparatus. If the user taps the target print processing apparatus display area 603, the print setting screen 601 transitions to a screen for changing the target print processing apparatus to a print processing apparatus found in a search made by another print plugin (the screen for changing the target print processing apparatus is not illustrated).

Now, an outline of the present exemplary embodiment will be described with reference to the sequence diagram of FIG. 15. First, in step S1501, the printing system 404 displays the print setting screen 601. In step S1502, the user makes desired print settings in the print setting area 604, and taps the print start button 605. Then, in step S1503, the print plugin control unit 406 of the printing system 404 transmits job information (including image data and the accepted print settings) to the print plugin 411. Here, the print setting screen 601 is hidden, and the application screen 501 is displayed again.

In step S1504, the print control unit 413 of the print plugin 411 receives the transmitted job information. In step S1505, the print control unit 413 checks the print settings included in the job information to determine whether the print processing apparatus 104 can perform printing. If the print processing apparatus 104 can perform printing (YES in step S1505), the processing proceeds to step S1506. In step S1506, the print control unit 413 transmits a print job to the target print processing apparatus displayed in the target print processing apparatus display area 603 (here, the print processing apparatus 104). In step S1507, the print processing apparatus 104 starts print processing based on the received print job.

Figure 9:
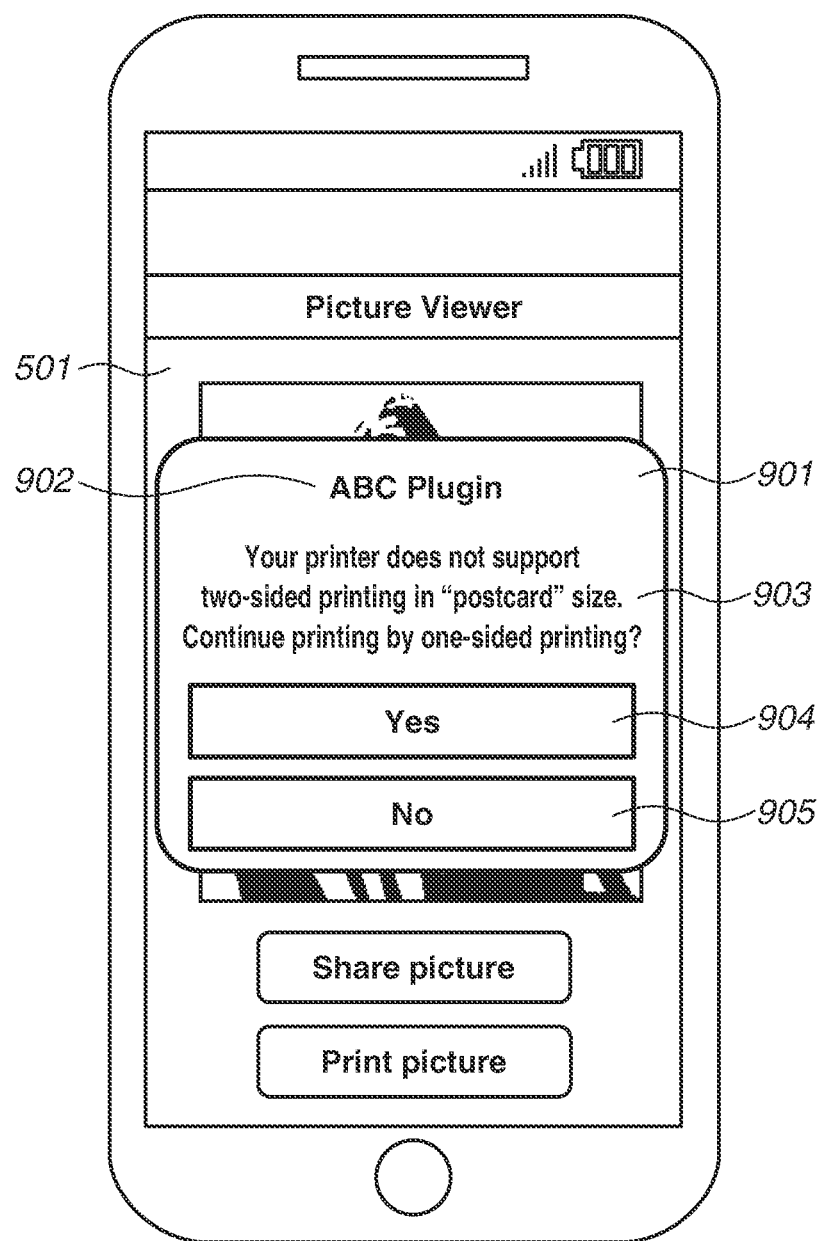
FIG. 9 is a diagram illustrating a warning message displayed on the data processing apparatus according to the first exemplary embodiment.

If, in step S1505, the print processing apparatus 104 is determined to be unable to perform printing (NO in step S1505), the processing proceeds to step S1508. Examples of the case where the print processing apparatus 104 is unable to perform print processing include a case where the print processing apparatus 104 is unable to perform print processing because of a combination of print settings made in step S1502, and a case where the print processing apparatus 104 is unusable due to a reason such as being in an error state. In step S1508, the print control unit 413 of the print plugin 411 determines whether a warning that printing is unable to be performed can be displayed. If the warning can be displayed (YES in step S1508), the processing proceeds to step S1509. In step S1509, the print plugin 411 running in the background displays the warning on a foreground screen as illustrated in FIG. 9.

If, in step S1508, the print control unit 413 determines that the warning is unable to be displayed (NO in step S1508), the processing proceeds to step S1510. In step S1510, the print control unit 413 instructs the OS 403 of the data processing apparatus 101 to issue a notification. Examples of the case where the warning is unable to be displayed include a case where the OS 403 of the data processing apparatus 101 satisfies a predetermined condition. For example, if the print control unit 413 obtains the version information about the OS 403 from the OS 403 and the OS 403 is Android 10 or later, the print control unit 413 determines that the warning is unable to be displayed. If the OS 403 is Android 10, the application running in the background (here, the print plugin 411) is unable to display a screen over the application screen 501 (screen of an application different from the print plugin 411) without the user's consent (instruction). Specifically, unlike FIG. 9, the print plugin 411 that is an application different from the application displaying the foreground application screen 501 is unable to display a warning screen 901 over the application screen 501.

Figure 8:
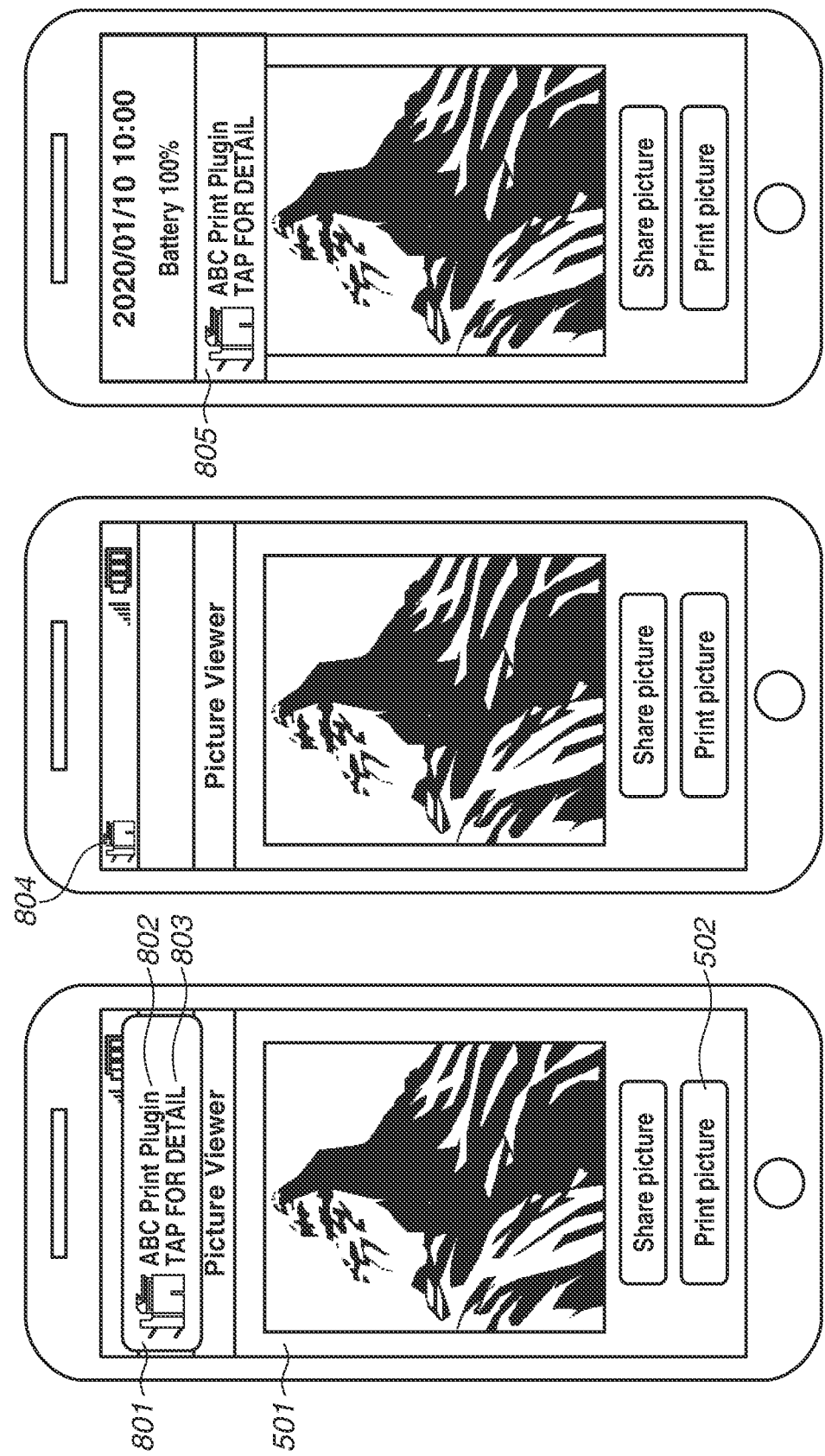
FIG. 8 is a diagram illustrating notifications issued by the data processing apparatus according to the first exemplary embodiment.

In step S1511, the OS 403 of the data processing apparatus 101, which is instructed to issue a notification by the print control unit 413 in step S1510, issues a notification 801 illustrated in FIG. 8. As employed herein, a notification refers to an Android OS "notification", such as a popup notification. If the user selects (taps) the notification, the processing proceeds to step S1509. In step S1509, the print plugin 411 can call and display a warning screen as illustrated in FIG. 9. Since the user has made the operation to select the notification, the warning screen here is displayed with the user's consent. In other words, the user's consent enables the print plugin 411 different from the application displaying the application screen 501 to display the warning screen over the application screen 501.

Figure 7:
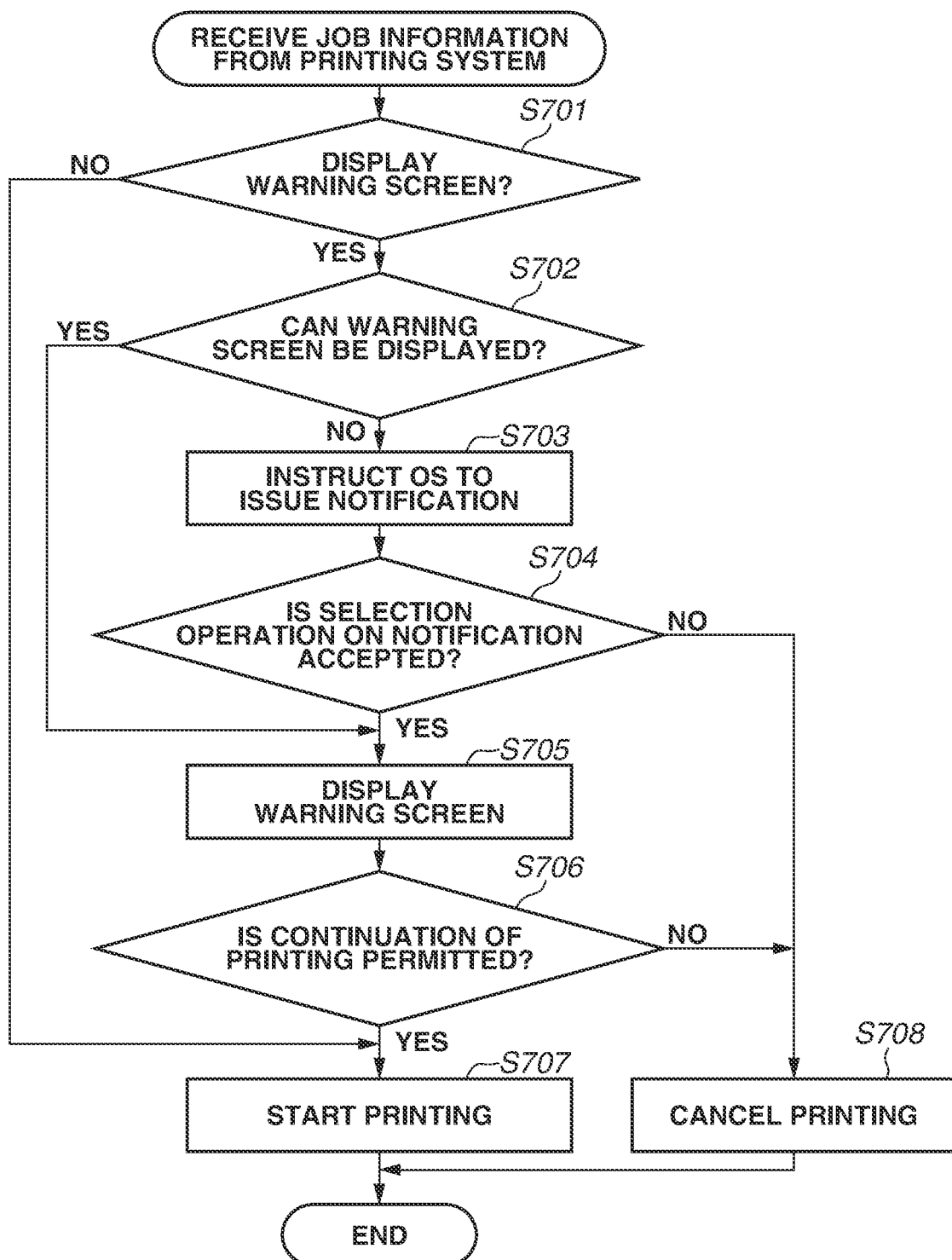
FIG. 7 is a flowchart illustrating processing of a print plugin according to the first exemplary embodiment.

Warning screen display processing to be performed by the print plugin 411 will be described with reference to FIG. 7. FIG. 7 is a flowchart illustrating the processing of steps S1504 to S1512 in the sequence diagram of FIG. 15. The steps illustrated in the flowchart of FIG. 7 are processed by the CPU 202 loading a control program stored in a memory such as the ROM 203 into the RAM 204 and executing the control program.

The flowchart is started when the print control unit 413 of the print plugin 411 receives the job information including the print settings accepted by the print setting screen 601 from the printing system 404. Here, the print setting screen 601 is hidden, and the application screen 501 is displayed.

Receiving the job information from the printing system 404, the print control unit 413 generates a print job. In step S701, the print control unit 413 determines whether printing can be performed or a warning screen is to be displayed based on the job information, the status information about the target print processing apparatus 104, and system settings of the data processing apparatus 101. For example, the print control unit 413 determines to display the warning screen if the print settings included in the job information conflict and printing is unable to be performed based on the print settings, or if the system settings of the data processing apparatus 101 needs to be changed in issuing an instruction to perform printing. Examples include where print settings including a sheet size "postcard" and a two-sided printing ON are made on a target print processing apparatus that is not capable of two-sided printing on a postcard. The capability information about the target print processing apparatus 104 to be used for the determination is obtained by the print control unit 413 at this timing or in advance.

In step S701, if the warning screen is determined to be displayed (YES in step S701), the processing proceeds to step S702. If no warning screen is determined to be displayed (NO in step S701), the processing proceeds to step S707. In step S707, the print control unit 413 transmits the print job to the print processing apparatus 104 to start print processing. Then, the flowchart ends.

Next, in step S702, the print plugin 411 determines whether the warning screen can be displayed. Specifically, the print plugin 411 determines whether the print plugin 411 different from the application displaying the application screen 501 can display the warning screen over the application screen 501. The determination may be made based on whether the OS 403 of the data processing apparatus 101 is Android 10 or later. Here, the print plugin 411 obtains the Android version information by using the API provided by the OS 403. The timing to obtain the version information is not limited thereto, and the version information may be obtained in advance. Examples of the timing include when the print plugin 411 is activated and when the print button 502 of FIG. 5 is pressed. If the warning screen can be displayed (YES in step S702), the processing proceeds to step S705. If the warning screen is unable to be displayed (NO in step S702), the processing proceeds to step S703.

Next, in step S703, the print plugin 411 instructs the OS 403 of the data processing apparatus 101 to issue a notification. Here, the print plugin 411 also passes notification contents to the OS 403 along with the instruction. The OS 403 of the data processing apparatus 101 receiving the request (instruction) to issue the notification from the print plugin 411 displays the notification 801 of FIG. 8 on the screen of the data processing apparatus 101. The notification 801 includes a name 802 of the print plugin 411 and a summary 803 of the notification. The summary 803 is not limited to the illustrated contents, and a message such as "Check your print settings" may be displayed. After a lapse of a certain time, the notification 801 disappears and is displayed in the form of an icon 804 on an upper part of the screen of the data processing apparatus 101. Notifications issued by various applications are displayed in the form of icons on the upper part of the screen of the data processing apparatus 101. If the user makes a swipe operation from the upper part to a lower part of the screen, the notification contents are displayed again in the form of a notification 805.

In step S704, the print plugin 411 determines a user operation performed on the notification 801 issued in step S703 or the notification 805. If the user's selection (tap) operation on the notification 801 or 805 is accepted, the data processing apparatus 101 determines that the user has intentionally selected the print plugin 411. This enables the print plugin 411 to display the warning screen over the application screen 501. If, in step S704, the user's selection operation on the notification 801 or 805 is accepted (YES in step S704), the processing proceeds to step S705. If an operation to delete the notification 801 or 805 (such as a swipe operation) from the user is accepted (NO in step S704), the processing proceeds to step S708. In step S708, the print control unit 413 cancels print processing. Then, the flowchart ends.

In step S705, the print plugin 411 displays the warning screen (dialog) 901 of FIG. 9 on the application screen 501. The warning dialog 901 of FIG. 9 includes a print plugin name 902, a message 903 describing details of the warning, and buttons 904 and 905 for the user to select "Yes" or "No" representing whether to permit continuation of printing.

In step S706, the print plugin 411 determines whether the user has selected to permit the continuation of printing on the warning dialog 901. If the user has tapped the button 904 on the warning dialog 901 to permit the continuation of printing (YES in step S706), the processing proceeds to step S707. In step S707, the print plugin 411 transmits the print job to the print processing apparatus 104 to start printing. Then, the flowchart ends. If the user has tapped the button 905 on the warning dialog 901 to not permit the continuation of printing (NO in step S706), the processing proceeds to step S708. In step S708, the print control unit 413 cancels the print processing. Then, the flowchart ends. While the warning dialog 901 of FIG. 9 is intended to prompt the user to select whether to permit the continuation of printing, the contents of the warning dialog 901 are not limited thereto. A button for transitioning to a screen for making the print settings again may be displayed. In such a case, the print plugin 411 can provide a setting screen for making the user change the print settings of an item not possible to be printed since the print plugin 411 has obtained the job information including the print settings from the printing system 404.

By the foregoing processing, the presence of a warning can be notified to the user, and the warning screen can be displayed, even if an application different from the application displaying an application screen is unable to display a screen over the application screen without the user's instruction because of reasons such as that the OS 403 of the data processing apparatus 101 is Android 10.

In the first exemplary embodiment, if no screen can be displayed over another and the print plugin 411 determines to display a warning, the notification is always issued. However, some users may find it annoying that such notification is issued every time. A second exemplary embodiment describes a case where a setting about whether to issue a notification upon occurrence of a warning as in the first exemplary embodiment or to continue or cancel printing without issuing the notification is accepted from the user in advance, and a data processing apparatus 101 is operated based on the setting. Since the basic configuration according to the present exemplary embodiment is similar to that of the first exemplary embodiment, only differences will be described.

Figure 10:
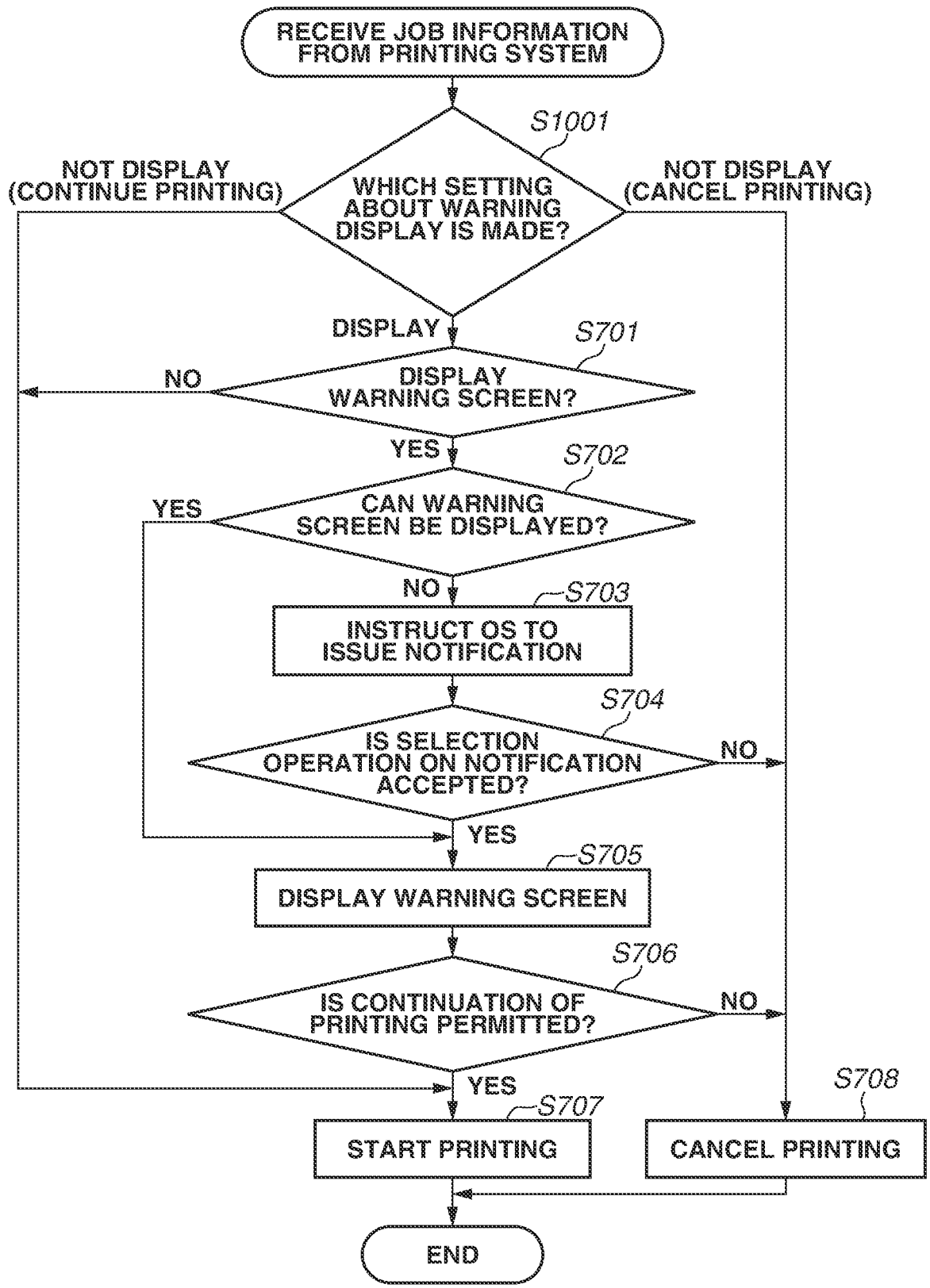
FIG. 10 is a flowchart illustrating processing of the print plugin according to a second exemplary embodiment.

FIG. 10 illustrates a flowchart of warning display processing to be performed by the print plugin 411 after the print start button 605 on the print setting screen 601 according to the present exemplary embodiment is tapped. The processing of the steps other than step S1001 in the flowchart is similar to that of FIG. 7 according to the first exemplary embodiment. Thus, a description thereof will be omitted.

A difference from the first exemplary embodiment is that, if the print plugin 411 receives job information including print settings from the printing system 404, in step S1001, the print plugin 411 checks a setting about a warning display. The setting about a warning display to be checked in step S1001 is made on a print plugin setting screen 1201 illustrated in FIG. 12.

Figure 11:
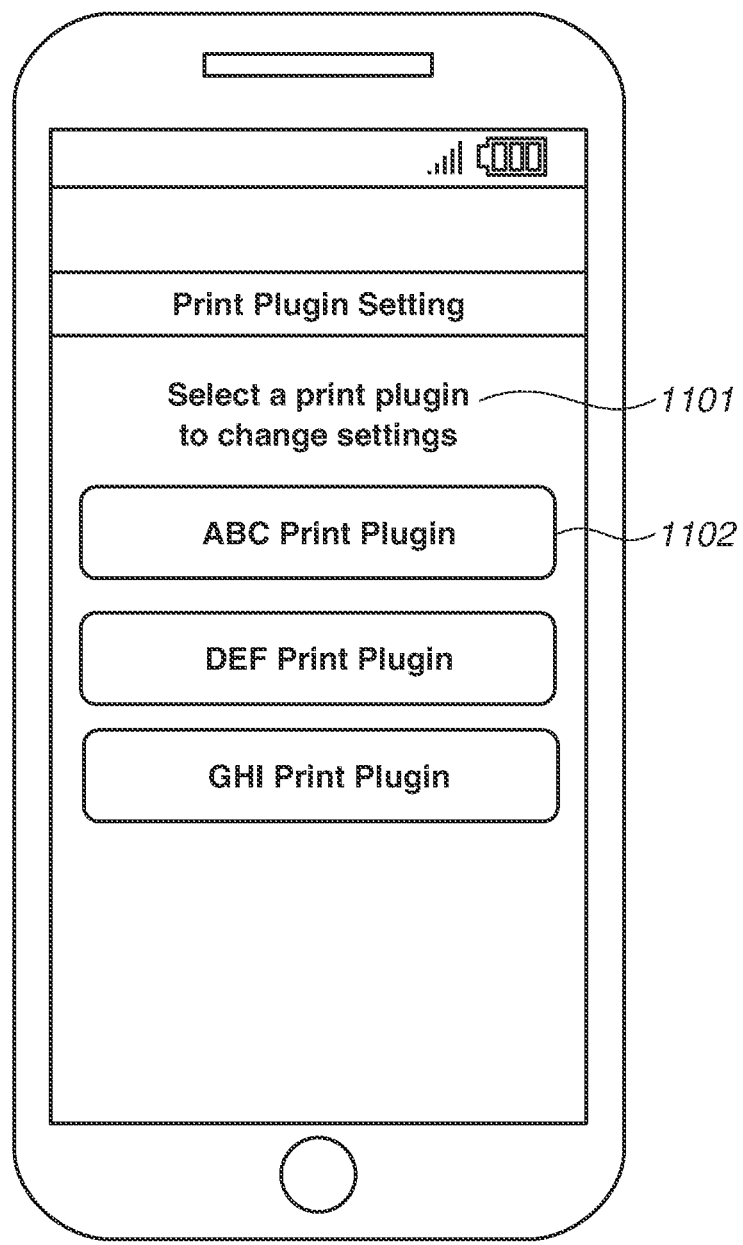
FIG. 11 is a diagram illustrating a print plugin list screen displayed on the data processing apparatus according to the second exemplary embodiment.

FIG. 11 is a diagram illustrating a list screen (print plugin list screen) 1101 of print plugins installed on the data processing apparatus 101. The list screen is part of a system setting screen of the data processing apparatus 101. If the user taps a button (for example, button 1102) labeled with the name of the print plugin to change settings, the screen transitions to the print plugin setting screen 1201 illustrated in FIG. 12.

Figure 12:
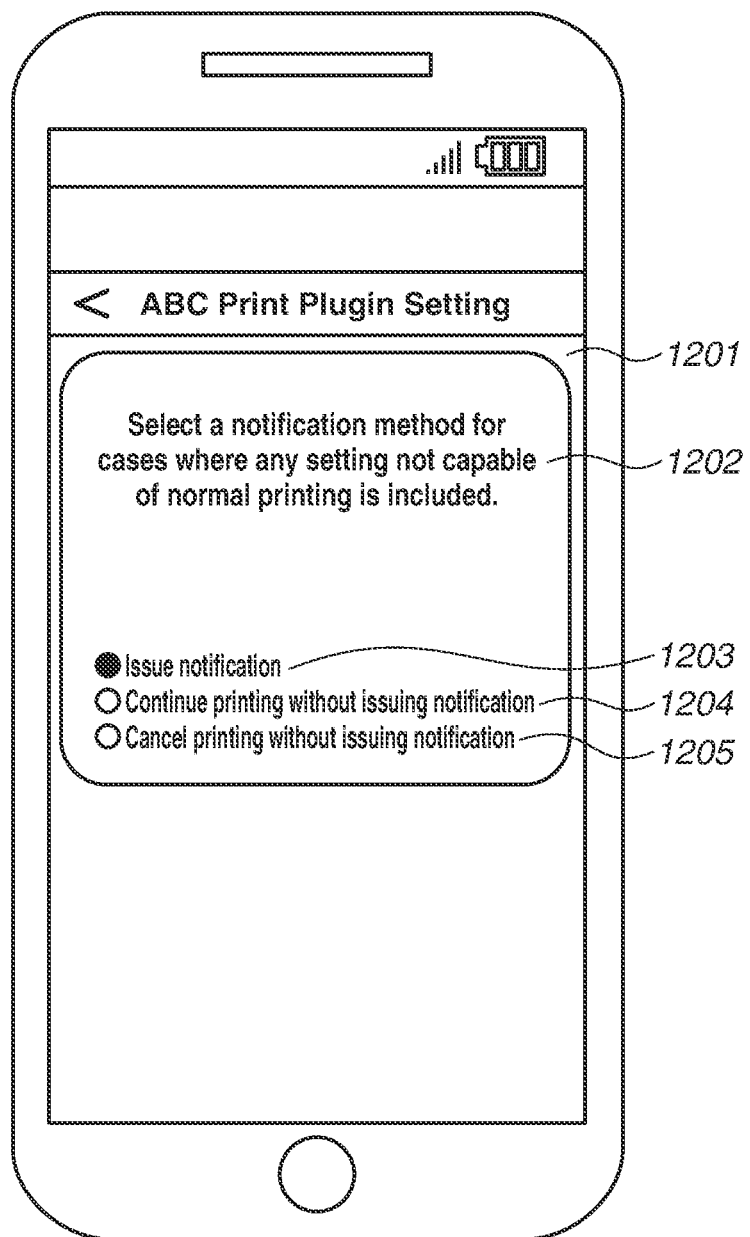
FIG. 12 is a diagram illustrating a print plugin setting screen displayed on the data processing apparatus according to the second exemplary embodiment.

FIG. 12 is a diagram illustrating an example of the setting screen (print plugin setting screen) 1201 of the print plugin selected on the print plugin list screen 1101. The print plugin setting screen 1201 displays a setting screen 1202 related to the warning display, and a setting can be selected from among options. A setting 1203 is intended to issue a notification (display a warning) as in the first exemplary embodiment. A setting 1204 is intended to continue printing without issuing a notification (without displaying a warning). Here, the print processing is performed by modifying the print settings to executable settings. A setting 1205 is intended to cancel printing without issuing a notification (cancel printing without displaying a warning).

In step S1001, the print plugin 411 checks the setting made by the user on the setting screen 1202 related to the warning display. If the setting 1203 to display a warning is selected (DISPLAY in step S1001), the processing proceeds to step S701. In step S701, the print plugin 411 performs the processing related to the warning display. If the setting 1204 to continue printing without displaying a warning is selected (NOT DISPLAY (CONTINUE PRINTING) in step S1001), the processing proceeds to step S707. In step S707, the print plugin 411 stars printing. Then, the flowchart ends. If the setting 1205 to cancel printing without displaying a warning is selected (NOT DISPLAY (CANCEL PRINTING) in step S1001), the processing proceeds to step S708. In step S708, the print plugin 411 cancels printing. Then, the flowchart ends.

By the foregoing processing, if a warning occurs during use of the print plugin 411, the print plugin 411 can cause the data processing apparatus 101 to perform a desired operation set by the user in advance. This improves usability since a setting to not issue a notification for warning display can be made. The print plugin setting screen 1201 in FIG. 12 is also capable of making a setting other than settings related to the warning display. Examples of such a setting include a setting about whether to permit notification from the print plugin 411. If the notification from the print plugin 411 is not permitted, the print processing can be cancelled since the print plugin 411 is unable to notify the user of the occurrence of the warning.

In the first and second exemplary embodiments, if the user deletes the notification issued by the print plugin 411 (NO in step S704), the print processing is cancelled. However, categorically cancelling the print processing upon deletion of the notification can impair the user's convenience. Thus, the print plugin 411 can be configured to continue the print processing when the notification is deleted. A third exemplary embodiment describes a case where a setting about whether to continue or cancel the print processing upon deletion of the notification is accepted from the user in advance, and the data processing apparatus 101 is operated based on the setting. Since the basic configuration according to the present exemplary embodiment is similar to that of the first and second exemplary embodiments, only differences will be described.

Figure 13:
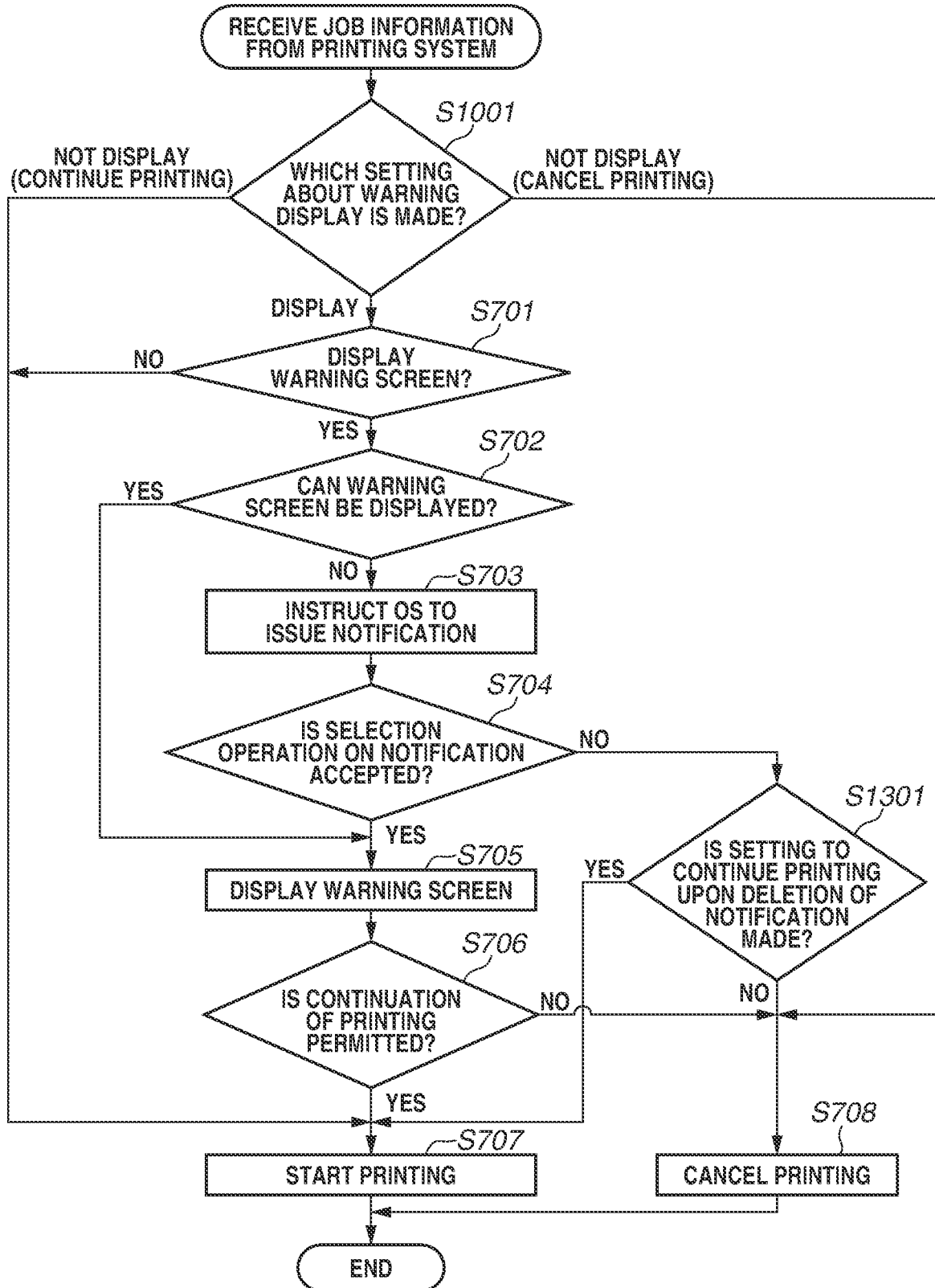
FIG. 13 is a flowchart illustrating processing of the print plugin according to a third exemplary embodiment.

FIG. 13 illustrates a flowchart of warning display processing to be performed by the print plugin 411 after the print start button 605 on the print setting screen 601 according to the present exemplary embodiment is tapped. The processing of the steps other than step S1301 in the flowchart is similar to that of FIG. 10 according to the second exemplary embodiment. Thus, a description thereof will be omitted.

A difference from the second exemplary embodiment is that, if the user deletes the notification in step S704 (NO in step S704), in step S1301, the print plugin 411 checks the setting about the operation upon deletion of the notification. The setting about the operation upon deletion of the notification to be checked in step S1301 is made from a setting screen (print plugin setting screen) 1201 for the operation of the print plugin 411 upon deletion of the notification, illustrated in FIG. 14.

Figure 14:
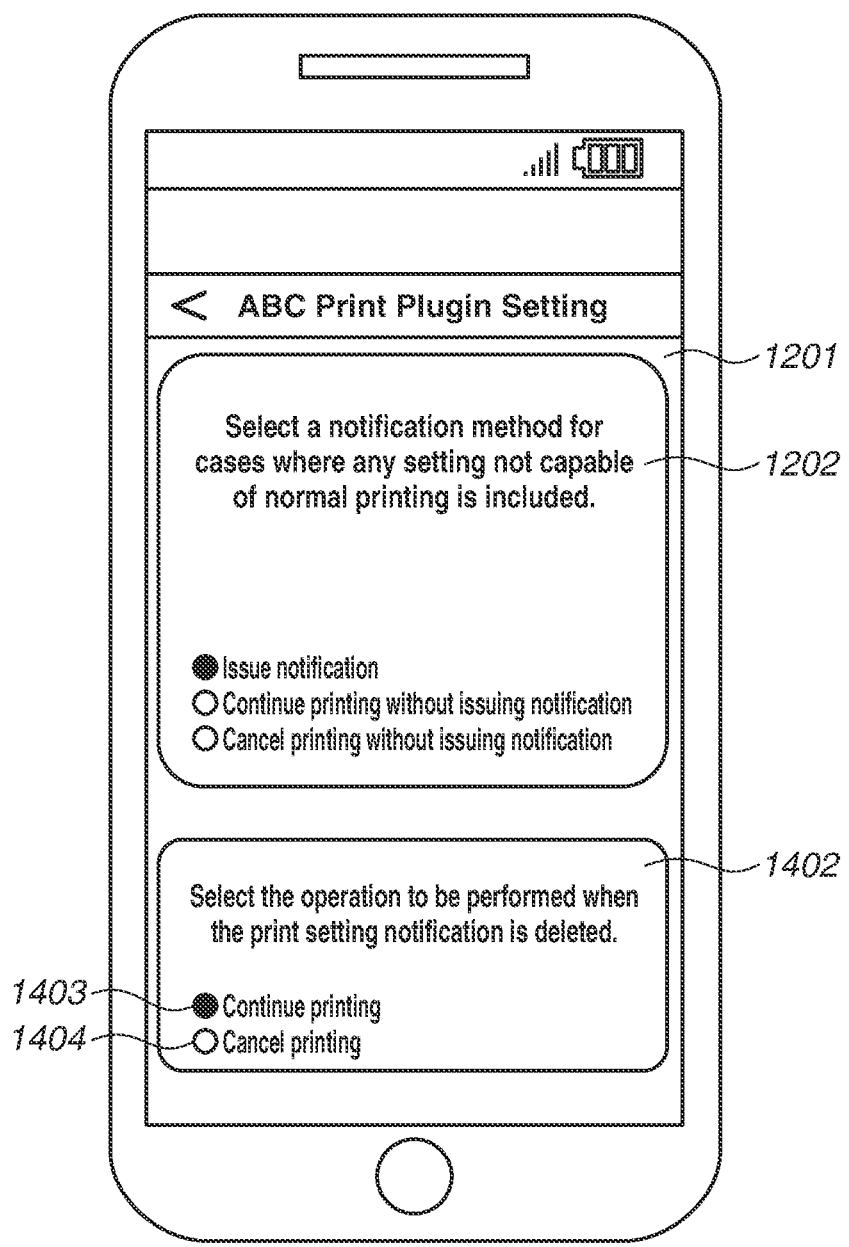
FIG. 14 is a diagram illustrating a setting screen for an operation upon deletion of a notification, displayed on the data processing apparatus according to the third exemplary embodiment.

FIG. 14 is a diagram illustrating an example of the print plugin setting screen 1201. A difference from the setting screen of FIG. 12 is that a notification deletion time setting screen 1402 is added. The user can make a setting about whether to continue the print processing upon deletion of the notification on the notification deletion time setting screen 1402.

In step S1301, the print plugin 411 checks the setting made by the user on the notification deletion time setting screen 1402. If a setting (1403 in FIG. 14) to continue printing upon deletion of the notification is selected (YES in step S1301), the processing proceeds to step S707. In step S707, the print plugin 411 continues the print processing. Then, the flowchart ends. If a setting (1404 in FIG. 14) to cancel printing upon deletion of the notification is selected (NO in step S1301), the processing proceeds to step S708. In step S708, the print plugin 411 cancels printing. Then, the flowchart ends.

By the foregoing processing, the operation of the data processing apparatus 101 upon deletion of the notification can be set to one desired by the user. In the first exemplary embodiment, the processing can be advanced by the user selecting (tapping) the notification to select whether to continue or cancel printing. However, this increases the number of steps and results in poor operability. The application of the present exemplary embodiment improves usability since the processing can be advanced to either continue or cancel printing by a single step of deleting the notification.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-010262, filed Jan. 24, 2020, which is hereby incorporated by reference herein in its entirety.

What is claimed is:

1. A method for a terminal configured to transmit a print job to a print processing apparatus, the method comprising:
in a case where an instruction to perform printing with a print setting accepted by the terminal is given by a user and a warning based on the print setting is to be displayed, instructing an operating system of the terminal to issue a notification for calling a warning screen; and
in a case where a predetermined operation performed on the notification by the user is accepted, displaying the warning screen over a screen of an application displayed on the terminal.

2. The method according to claim 1, wherein the instructing is performed in a case where the warning screen is unable to be displayed over the screen of the application displayed on the terminal.

3. The method according to claim 2, wherein in a case where the operating system of the terminal is in a version satisfying a predetermined condition, the warning screen is unable to be displayed over the screen of the application displayed on the terminal.

4. The method according to claim 3, wherein the case where the operating system of the terminal is in the version satisfying the predetermined condition is a case where the operating system of the terminal is Android 10.

5. The method according to claim 2, wherein in a case where the operating system of the terminal is in a version satisfying a predetermined condition, another application different from the application is unable to display a screen over the screen of the application without accepting an instruction from the user.

6. The method according to claim 1, further comprising, in a case where the print processing apparatus is unable to perform print processing with the print setting, determining that the warning is to be displayed based on information about the print setting accepted by the terminal.

7. The method according to claim 1, further comprising, in a case where the print processing apparatus is not usable, determining that the warning is to be displayed.

8. The method according to claim 1, further comprising:
generating the print job based on the print setting accepted by the operating system of the terminal; and transmitting the generated print job to the print processing apparatus.

9. The method according to claim 1, wherein the notification is a popup notification displayed on the terminal.

10. The method according to claim 1, wherein the warning screen includes contents for inquiring the user whether to continue print processing.

11. The method according to claim 1, wherein in a case where the issued notification is deleted by a user operation, print processing corresponding to the print setting is cancelled.

12. The method according to claim 1, wherein the method is performed by a print plugin program running on the terminal.

13. The method according to claim 12, wherein the operating system of the terminal is configured to accept the print setting and transmit information about the print setting to the print plugin program.

14. The method according to claim 1, wherein the predetermined operation refers to a selection operation performed on the notification.

15. The method according to claim 1, wherein a setting about whether to issue the notification, continue print processing corresponding to the print setting, or cancel the print processing in a case where the warning screen is unable to be displayed over the screen of the application displayed on the terminal is accepted in advance, and the terminal is operated based on the setting.

16. The method according to claim 1, further comprising, in a case where the issued notification is deleted by a user operation, controlling print processing corresponding to the print setting to be continued or canceled.

17. A terminal configured to transmit a print job to a print processing apparatus, the terminal being configured to:
  in a case where an instruction to perform printing with a print setting accepted by the terminal is given by a user and a warning based on the print setting is to be displayed, instruct an operating system of the terminal to issue a notification for calling a warning screen; and
  in a case where a predetermined operation performed on the notification by the user is accepted, display the warning screen over a screen of an application displayed on the terminal.

18. A non-transitory computer-readable storage medium storing a program to cause a computer to perform a method for a terminal configured to transmit a print job to a print processing apparatus, the method comprising:
  in a case where an instruction to perform printing with a print setting accepted by the terminal is given by a user and a warning based on the print setting is to be displayed, instructing an operating system of the terminal to issue a notification for calling a warning screen; and
  in a case where a predetermined operation performed on the notification by the user is accepted, displaying the warning screen over a screen of an application displayed on the terminal.

* * * * *